United States Patent
DeVita et al.

(10) Patent No.: US 9,428,267 B2
(45) Date of Patent: Aug. 30, 2016

(54) IN-FLIGHT MECHANICALLY ASSISTED TURBINE ENGINE STARTING SYSTEM

(71) Applicant: Sikorsky Aircraft Corporation, Stratford, CT (US)

(72) Inventors: Michael Joseph DeVita, Cos Cob, CT (US); Mark Denton Bystry, Jr., Stratford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 273 days.

(21) Appl. No.: 14/147,916

(22) Filed: Jan. 6, 2014

(65) Prior Publication Data
US 2015/0191250 A1    Jul. 9, 2015

(51) Int. Cl.
*B64C 27/12*    (2006.01)
*F02C 7/262*    (2006.01)
*F02C 7/32*    (2006.01)
*F02C 9/00*    (2006.01)
*F02C 7/275*    (2006.01)

(52) U.S. Cl.
CPC .............. *B64C 27/12* (2013.01); *F02C 7/262* (2013.01); *F02C 7/275* (2013.01); *F02C 7/32* (2013.01); *F02C 9/00* (2013.01); *F05D 2220/329* (2013.01); *F05D 2260/43* (2013.01); *F05D 2260/85* (2013.01)

(58) Field of Classification Search
CPC .............................. B60W 10/06; B60W 10/10
See application file for complete search history.

(56) References Cited

U.S. PATENT DOCUMENTS

| | | | |
|---|---|---|---|
| 7,204,090 B2 * | 4/2007 | O'Connor | F02C 7/275 60/39.08 |
| 7,937,949 B2 | 5/2011 | Eccles et al. | |
| 8,461,704 B2 | 6/2013 | McLoughlin et al. | |
| 9,193,451 B2 * | 11/2015 | Salyer | B64C 37/00 |
| 2009/0145998 A1 * | 6/2009 | Salyer | B64C 27/04 244/17.23 |
| 2011/0049891 A1 | 3/2011 | Bedrine et al. | |
| 2011/0061396 A1 | 3/2011 | Dooley | |

OTHER PUBLICATIONS

Helicopter Flying Handbook, 2012, U.S. Department of Transportation Federal Aviation Administration Flight Standards Service, Chapter 4.*

* cited by examiner

*Primary Examiner* — Thomas G Black
*Assistant Examiner* — Ana Thomas
(74) *Attorney, Agent, or Firm* — Cantor Colburn LLP

(57) ABSTRACT

An engine starting system for a rotary wing aircraft includes a controller that receives a signal indicative of a start command for an engine, a transmission input module that is mechanically coupled to a transmission system and an accessory gearbox and a starter motor that is mechanically coupled to a compressor drive shaft of the engine. Also, a method for restarting an engine in flight includes receiving by a controller a signal indicative of a start command for the engine, determining by the controller that an overrunning clutch is coupled to the engine, transmitting by a transmission system motive power to the engine in response to the determining that the overrunning clutch is coupled to the engine and driving via a compressor drive shaft a compressor section of the engine according to a design speed.

26 Claims, 3 Drawing Sheets

IN-FLIGHT MECHANICALLY ASSISTED TURBINE ENGINE STARTING SYSTEM

STATEMENT REGARDING FEDERALLY SPONSORED RESEARCH OR DEVELOPMENT

This invention was made with Government support from the United States Air Force under Contract No. FA8650-09-D-2923. The Government therefore has certain rights in this invention.

FIELD OF THE INVENTION

The subject matter disclosed herein relates generally to propulsion systems and to, in particular, to a system and method for reliably starting a turbine engine in flight.

DESCRIPTION OF THE RELATED ART

Rotary wing aircraft utilize propulsion systems to power aircraft flight. These propulsion systems may include a turbine engine, a spark ignition engine, or a compression ignition engine. A turbine engine typically includes a compressor section, a combustion section, and a turbine section. The compressor section compresses air provided at an intake end of the gas turbine engine and provides the compressed air to the combustor section. Fuel is added to the compressed air, and the resulting mixture is ignited within the combustion section to produce combustion gases. The combustion gases are directed to the turbine section, which extracts energy from the combustion gases to provide the motive force necessary to rotate the compressor section and provide electrical power for auxiliary components.

A turbine engine shut down in flight, whether directed by the pilot or due to system failure, needs to be restarted reliably. In a conventional rotorcraft, the pilot selects the appropriate type of start mode. For example, one such mode is an assisted start mode in which an electric or pneumatic starter motor is used to initially provide a motive force to the shaft connected to the compressor. The starter motor may be used to increase the speed of the compressor section to a required speed at which the compressed air provided to the combustion section results in a fuel/air mixture that is suitable for ignition (commonly referred to as "light-off"). The starter motor has to sustain the power delivered to the compressor shaft for up to a minute during the restart. For a worst case condition where the engine has shut-down in flight due to a system failure, this duration may be too long.

Following light-off, the starter motor is discontinued when the gas turbine engine is self-sustaining (i.e., the power generated by the turbine section is sufficient to power the compressor section) such that the gas turbine engine does not require the motive force from the starter motor. Large rotorcraft use pneumatic motors driven by auxiliary power units (APU) or ground cart power packs in lieu of carrying a large battery pack. If an electric motor is used for in-flight starting of the gas turbine engine, it may have to be sized to a larger power to decrease start time and/or accommodate worst case starting conditions. An aircraft propulsion system that provides a reliable mechanically assisted turbine engine starting system without a need for a large battery or an oversized starter motor would provide greater value to the operator of the aircraft.

BRIEF SUMMARY OF THE INVENTION

An aspect of the invention includes an engine starting system for a rotary wing aircraft that includes a controller that receives a signal indicative of a start command for an engine, a transmission input module that is mechanically coupled to a transmission system and an accessory gearbox and a starter motor that is mechanically coupled to a compressor drive shaft of the engine.

Another aspect of the invention includes a method for restarting an engine in flight for a rotary wing aircraft. The method includes receiving by a controller a signal indicative of a start command for the engine; determining by the controller that an overrunning clutch is coupled to the engine; transmitting by a transmission system motive power to the engine in response to the determining that the overrunning clutch is coupled to the engine; and driving via a compressor drive shaft a compressor section of the engine according to a design speed.

Other aspects, features and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION OF THE INVENTION

Figure 1:
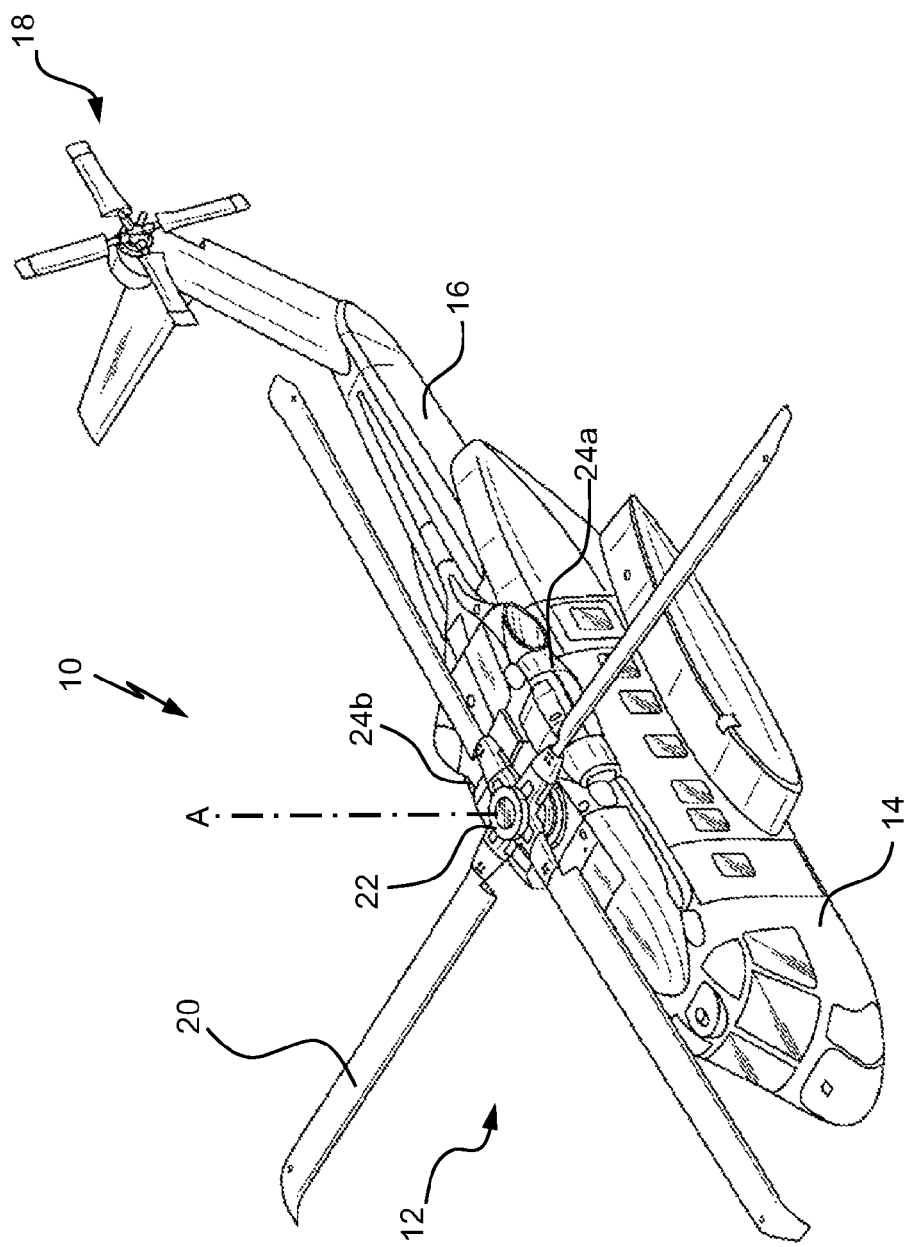
FIG. 1 is a general perspective view of a rotary wing aircraft in an exemplary embodiment.

FIG. 1 schematically illustrates a rotary wing aircraft 10 which includes an in-flight turbine engine starting system according to an embodiment. The aircraft 10 includes an airframe 14 having a main rotor assembly 12 and an extending tail 16 which mounts a tail rotor system 18, such as an anti-torque system, a translational thrust system, a pusher propeller, a rotor propulsion system and the like. The main rotor assembly 12 includes a plurality of rotor blades 20 mounted to a rotor hub 22. The main rotor assembly 12 is driven about an axis of rotation A through a main rotor gearbox (not shown) by a multi-engine powerplant system, here shown as two internal combustion engines 24a-24b. The internal combustion engines 24a-24b generate the power available to the aircraft 10 for driving a transmission system that is connected to a main rotor assembly 12 and a tail rotor system 18 as well as for driving various other rotating components to thereby supply electrical power for flight operations. In embodiments, the internal combustion engines 24a-24b may include a turbine engine, a spark ignition engine, or a compression ignition engine. In embodiments, the rotary wing aircraft 10 may utilize a plurality of approaches for reliably restarting the internal combustion engines 24a-24b. The approaches may be utilized for a dual engine aircraft, such as the rotary wing aircraft 10 that operates in a single engine operating (SEO) mode to save fuel or to restart an engine that has shut-down due to a failure. Although a particular helicopter configuration is illustrated and described in the disclosed embodiments, other configurations and/or machines, such as high speed compound rotary wing aircraft with supplemental translational thrust systems, dual contra-rotating, coaxial rotor system aircraft, tilt-rotors and tilt-wing aircraft, and fixed wing aircraft, will also benefit from embodiments of the invention.

Figure 2:
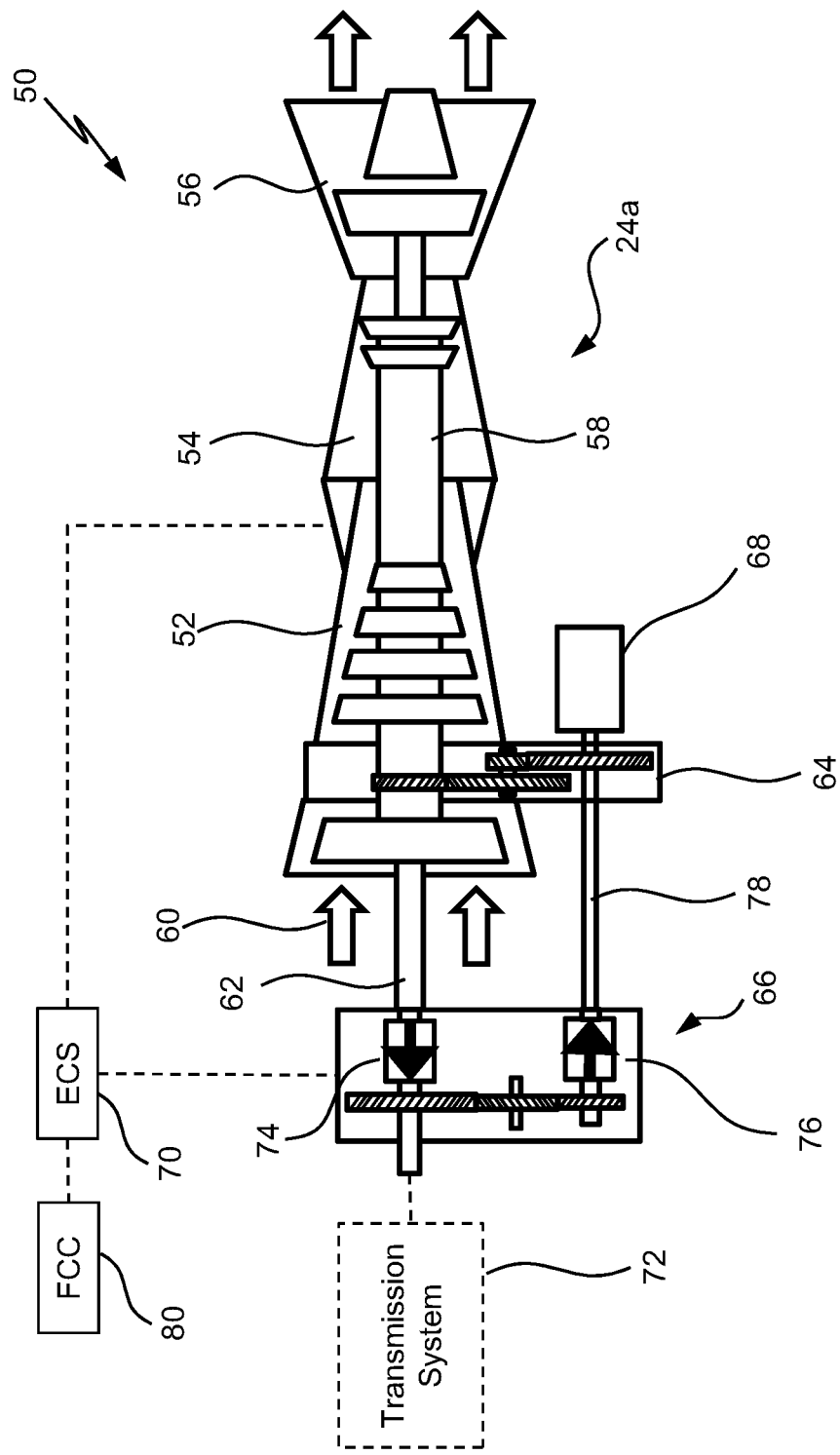
FIG. 2 is a schematic view of an engine starting system according to an exemplary embodiment.

FIG. 2 depicts a schematic view of an engine starting system 50 for a rotary wing aircraft 10 (See FIG. 1) according to an exemplary embodiment. Engine starting system 50 includes one or more internal combustion engines 24a-24b (although only one engine 24a is depicted in FIG. 2), a transmission input module 66, a starter motor 68, an engine controller 70 such as an Engine Control System (ECS), a computer 80 such as a flight control computer (FCC), and an accessory gearbox 64. It is to be understood that many of the ancillary systems that may be coupled to internal combustion engines 24a-24b and transmission system 72 such as a fuel system, pumps, or individual blade control (IBC) servos, hydraulic actuators, aircraft electric power generators, etc. or the like are not shown in FIG. 2 for ease of description of embodiments of the invention.

As illustrated in FIG. 2, internal combustion engine 24a includes a compression section 52, a combustion section 54, a turbine section 56, and a two spool rotor system having a compressor drive shaft 58 and an engine output shaft 62. Typically, compression section 52 compresses inlet air 60 at an intake end of internal combustion engine 24a and provides the compressed air to combustion section 54. Fuel is added to the compressed air, and the resulting mixture is ignited within combustion section 54 in order to produce combustion gases. The combustion gases are directed to turbine section 56, which extracts energy from the combustion gases to rotate compressor drive shaft 58 and the engine output shaft 62. The compressor drive shaft 58 is coupled to accessory gearbox 64 which receives the mechanical energy from the compressor drive shaft 58 to power various accessories like a fuel system, combustors and other accessories to supply electric power for flight operations. Engine output shaft 62 provides the motive force to drive main rotor assembly 12 and tail rotor system 18.

The transmission input module 66 includes a plurality of free wheel units 74-76 (i.e., each free-wheel unit is an overrunning or one-way clutch) and gears for selectively engaging and disengaging the transmission system 72. During a normal operating mode of the aircraft 10, free wheel unit 74, e.g., a clutch, connects engine output shaft 62 to transmission system 72 (i.e., engages the transmission system 72) when the rotation speed of engine output shaft 62 matches the rotation speed of main rotor assembly 12 and disconnects engine output shaft 62 from transmission system 72 (i.e., disengages the transmission system 72) when the rotation speed of engine output shaft 62 is less than the rotation speed of main rotor assembly 12 so that main rotor assembly 12 may be free to rotate during flight if internal combustion engine 24a fails or is shut down. During this normal operating mode, free wheel unit 74 transmits motive force from internal combustion engine 24a to main rotor assembly 12 and tail rotor system 18 (See FIG. 1) and overruns internal combustion engine 24a when engine output shaft 62 is less than the rotation speed of main rotor assembly 12.

Transmission input module 66 further includes a second free wheel unit 76, e.g., a clutch, which is mechanically coupled to an accessory gearbox 64 via a take-off shaft 78. Take-off shaft 78 is also coupled to a starter motor 68 for supplementing the power delivered from second internal combustion engine 24b (See FIG. 1) during in-flight starting of a failed or shut-down engine such as, e.g., internal combustion engine 24a. Engine compressor drive shaft 58 may be selectively coupled to transmission system 72 via free wheel unit 76 in order to back-drive engine 24a from a second internal combustion engine 24b (See FIG. 1) and supplement the power delivered by a starter motor 68 during a restart mode of internal combustion engine 24a. In an embodiment, free-wheel unit 76 may be continuously connected to accessory gear box 64 in order to drive accessory gearbox 64 through second internal combustion engine 24b (See FIG. 1) via transmission system 72 and provide power to restart internal combustion engine 24a. In this embodiment, compressor drive shaft 58 is continually connected to free wheel unit 76 and rotates take-off shaft 78 during normal operating mode. In another embodiment, free-wheel unit 76 may be a controllable clutch that selectively engages or disengages transmission system 72 to take-off shaft 78 in order to provide controllable power and back-drive compressor drive shaft 58 from second internal combustion engine 24b in order to restart a shut-down internal combustion engine 24a during an in-flight starting mode. These embodiments will be described in detail below with reference to FIG. 3.

Also, engine starting system 50 includes a controller 70 that is in communication with one or more internal combustion engines 24a-24b, and transmission input module 66 such as a Full Authority Digital Engine Controllers (FADEC). In an embodiment, controller 70 receives commands to selectively connect free-wheel unit 76 to take-off shaft 78 during the in-flight starting mode. The manner in which controller 70 operates to control internal combustion engine 24a during normal operation and/or in-flight starting may vary according to system design approaches and at a design speed in order to reduce or eliminate the time delay and power required from starter motor 68. In particular, and as will be described in more detail, engine controller 70 provides command signals to transmission input module 66, starter 68, internal combustion engine 24a, and fuel system (not shown) according to control logic and these commands can come from a pilot or from FCC 80 automation. Controller 70 may include memory to store instructions that are executed by a processor. The executable instructions may be stored or organized in any manner and at any level of abstraction, such as in connection with controlling engine starting system 50. The processor can be any type of central processing unit (CPU), including a general purpose processor, a digital signal processor, a microcontroller, an application specific integrated circuit (ASIC), a field programmable gate array, or the like. Also, in embodiments, the memory may include random access memory (RAM), read only memory (ROM), or other electronic, optical, magnetic, or any other computer readable medium onto which is stored the data and control algorithms for controlling the internal combustion engines 24a-24b, the starter motor 68, engine starting system 50, and other operational data for rotary wing aircraft 10 (FIG. 1).

Figure 3:
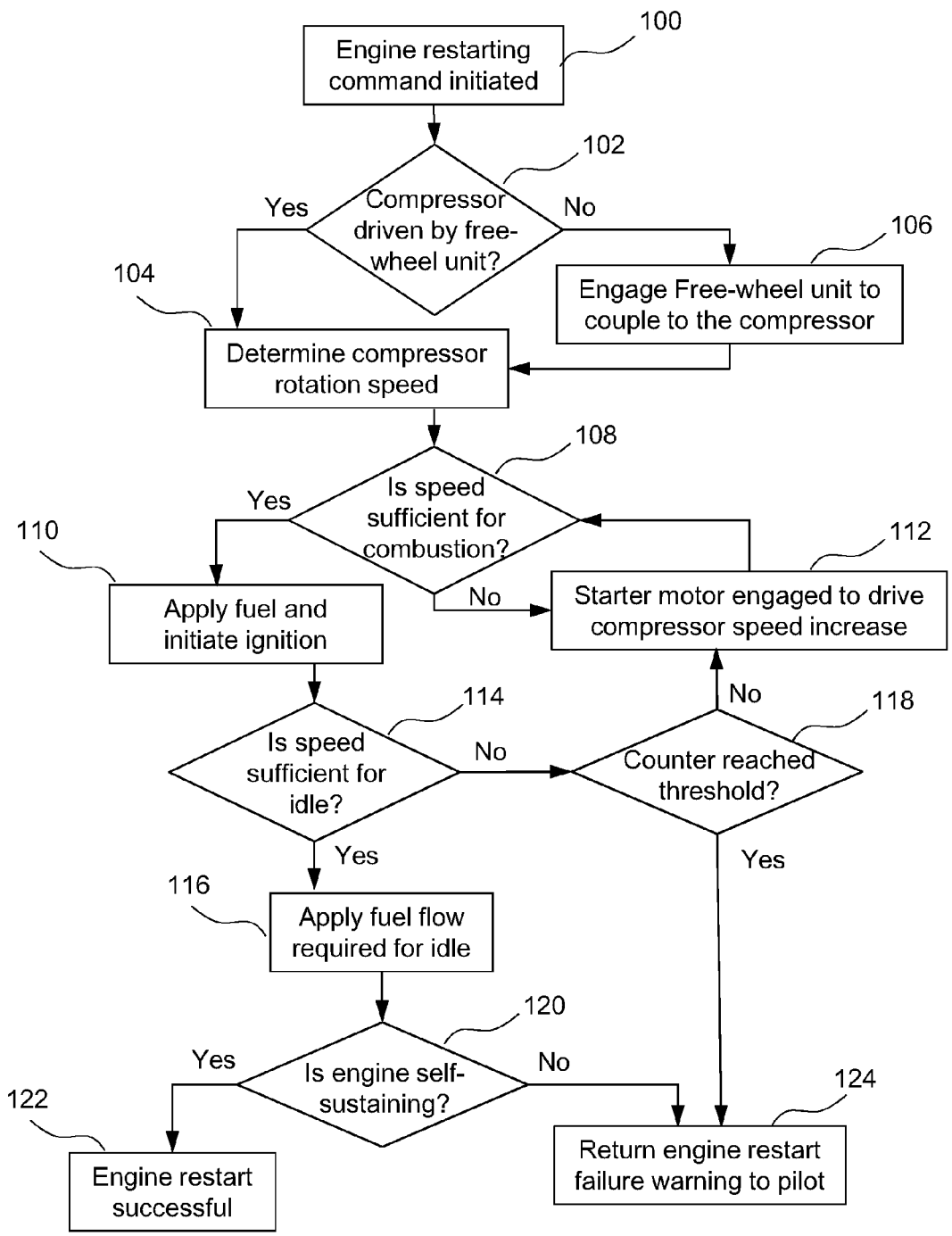
FIG. 3 is a flowchart for starting an engine in-flight for a rotary wing aircraft according to an embodiment of the invention

FIG. 3 is a flowchart of an exemplary process for restarting an internal combustion engine such as, e.g., an internal combustion engine 24a that has failed or has been shut down during flight during a SEO mode. The exemplary process depicts an algorithm that may be associated with engine starting system 50 and is executed by the controller 70 according to logic stored in memory for restarting the internal combustion engine 24a. As such, FIG. 2 is also being referenced in the description of the exemplary process of FIG. 3.

The process begins at 100 where controller 70 receives a command for restarting a failed or shut-down internal combustion engine, e.g., such as internal combustion engine 24a. At 102, controller 70 determines if free-wheel unit 76 is coupled to a second internal combustion engine 24b (See FIG. 1) through a take-off shaft 78. If free-wheel unit 76 is coupled to take-off shaft 78, free-wheel unit 76 is transmitting motive power from the second engine 24b to compressor drive shaft 58 through accessory gearbox 64 in order to drive the rotation of compressor drive shaft 58 according to the design speed. The flow continues to 104 where controller 70 determines the speed of the rotating compressor drive shaft 58.

However, at 102, if controller 70 determines that freewheel unit 76 is not coupled to an internal combustion engine 24b through take-off shaft 78 then, at 106, controller 70 selectively engages free-wheel unit 76 in order to couple second internal combustion engine 24b (See FIG. 1) to internal combustion engine 24a through take-off shaft 78 in order to drive compressor drive shaft 58. In an example, free-wheel unit 76 is disengaged during SEO mode or failure of engine 24a to eliminate the parasitic loss of power on internal combustion engine 24b to drive compressor drive shaft 58 through take-off shaft 78 and accessory gearbox 64. Flow continues to 104 where controller 70 determines the speed of the rotating compressor drive shaft 58.

At 104, controller 70 determines the rotation speed of compressor drive shaft 58. Flow continues to 108 where controller 70 determines if the rotation speed of compressor drive shaft 58 is sufficient to initiate the combustion sequence. If compressor drive shaft 58 is driven at a speed in which fuel pressure is developed and igniters are powered for firing combustion section 54, flow proceeds to 110 where fuel is introduced with the compressed air provided to combustion section 54 resulting in a fuel/air mixture that is suitable for ignition to initiate combustion (commonly referred to as "light-off").

However, at 108, if controller 70 determines the rotation speed of compressor section 52 is not sufficient to initiate the combustion sequence, flow continues to 112 where starter motor 68 is engaged to drive an increase in speed of compressor drive shaft 58. As the rotation speed of compressor drive shaft 58 exceeds the design speed for which internal combustion engine 24b provide motive power, the free-wheel unit 76 will allow take-off shaft 78, accessory gearbox 64 and compressor drive shaft 58 to overrun the drive of input module 66. Flow reverts back to 108, where controller 70 determines that the rotation speed of compression section 52 is sufficient to initiate the combustion sequence. Flow then proceeds to 110 where fuel is introduced with the compressed air provided to combustion section 54 resulting in a fuel/air mixture that is suitable for "light-off".

At 114, following "light-off", if controller 70 determines that the rotation speed of compressor drive shaft 58 is sufficient for idle, flow continues to 116 where fuel flow is increased to feed the combustion process to reach idle condition. If the design speed of the take-off shaft 78 drives compressor drive shaft 58 at a speed sufficient for idle, engine 24b continues to provide motive power to drive compressor drive shaft 58 through accessory gearbox 64.

However, at 114, if controller 70 determines that the rotation speed of the compressor drive shaft 58 is not sufficient for idle, flow continues to 118 where controller 70 determines if a counter or timer setting has been reached. If the counter has yet to reach the defined threshold, flow reverts back to 112 where starter motor 68 is engaged to drive an increase in speed of compressor drive shaft 58. As the rotation speed of compressor section 54 exceeds the design speed for which internal combustion engine 24b provides motive power, freewheel unit 76 will allow take-off shaft 78, accessory gearbox 64 and compressor drive shaft 58 to overrun the drive of input module 66. Flow continues to 108, where controller 70 determines that the rotation speed of compression section 52 is sufficient to initiate the combustion sequence. If again controller 70 determines that the rotation speed of combustion section 54 is not sufficient for idle, controller 70 determines if a counter or timer setting has been reached. If at 118, controller 70 determines the counter or timer threshold has been reached, flow continues to 124 where an engine restart failure warning is displayed to the pilot.

However, if at 114, controller 70 determines that the rotation speed of compression section 52 is sufficient for idle, flow continues to 116 where fuel flow is increased to that required for engine idle. Flow continues to 120 where controller 70 determines if the engine is self-sustaining (i.e., the power generated by combustion section 54 is sufficient to power compression section 52) and no longer requires drive assistance from starter motor 68 or engine 24b through take-off shaft 78. Flow continues to 122 where confirmation to the pilot and FCC that engine 24a has restarted successfully and is available to provide power to the vehicle rotor/drive system.

However, if at 120, controller 70 determines internal combustion engine 24a is not self-sustaining, flow continues to 124 where an engine restart failure warning is displayed to the pilot. Internal combustion engine 24a is considered self-sustaining when the combustion in combustion section 54 is sufficient to drive the compressor drive shaft 58 without additional motive power input from either second engine 24b (See FIG. 1) through take-off shaft 78 or from starter motor 68, flow continues to 122 where engine 24a restart is successful and status reported to the pilot and/or flight control computer.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions or equivalent arrangement not hereto described will be apparent to those of ordinary skill in the art without departing from the scope and spirit of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An engine starting system for a rotary wing aircraft, comprising:
    a controller that receives a signal indicative of a start command for an engine;
    a transmission input module that is mechanically coupled to a transmission system and an accessory gearbox, the transmission input including a freewheel device; and
    a starter motor that is mechanically coupled to a compressor drive shaft of the engine, wherein the controller is configured to couple the freewheel device to the compressor drive shaft and transmit motive power from a second engine to the compressor drive shaft.

2. The engine starting system of claim 1, wherein the starter motor is mechanically coupled to the compressor drive shaft via an accessory gearbox;
    wherein the accessory gearbox is configured for transmitting mechanical power from the transmission system to the compressor drive shaft according to a starting mode.

3. The engine starting system of claim 1, wherein the transmission input module comprises a first freewheel device coupled to an engine drive shaft of the engine and a second freewheel device coupled to the compressor drive shaft via a take back shaft.

4. The engine starting system of claim 3, wherein the compressor drive shaft is coupled to a starter motor, wherein the starter motor is configured to mechanically rotate the compressor drive shaft.

5. The engine starting system of claim 3, wherein the first freewheel device is configured to transmit motive power from the transmission input module in order to maintain a design speed of the compressor drive shaft and maintain a light-off ready condition in a combustion section of the engine.

6. The engine starting system of claim 1, wherein the transmission system is configured for transmitting motive power from a second engine to the compressor drive shaft via the transmission input module.

7. The engine starting system of claim 1, wherein the transmission system is configured for transmitting motive power from the energy stored in the rotating rotor/drive system to the compressor drive shaft via the transmission input module.

8. The engine starting system of claim 1, wherein the controller is configured to transmit motive power from the transmission input module in order to accelerate the compressor drive shaft and generate a light-off condition in a combustion section of the engine.

9. The engine starting system of claim 1, wherein the controller is configured to transmit motive power from the starter motor in order to accelerate the compressor drive shaft in response to a light-off condition.

10. The engine starting system of claim 1, wherein the controller is configured to decouple the transmission input module from the compressor drive shaft in response to a light-off condition.

11. The engine starting system of claim 1, wherein the controller is configured to accelerate the compressor drive shaft with motive power from the transmission input module in response to a light-off condition.

12. The engine starting system of claim 1, wherein the controller is configured to accelerate the compressor drive shaft to a sub-idle speed in response to a light-off condition.

13. The engine starting system of claim 1, wherein the first freewheel device is configured to transmit motive power from the transmission input module in order to maintain a design speed of the compressor drive shaft and maintain a sub-idle condition in a combustion section of the engine.

14. The engine starting system of claim 1, wherein the controller is configured to decouple the transmission input module from the compressor drive shaft in response to an idle condition.

15. The engine starting system of claim 1, wherein the controller is configured to decouple the transmission input module from the compressor drive shaft to reduce the parasitic loss of power on the transmission system.

16. A method for restarting an engine in flight for a rotary wing aircraft, comprising:
receiving by a controller a signal indicative of a start command for the engine;
determining by the controller that an overrunning clutch is coupled to the engine;
coupling the overrunning clutch to the engine upon determining that the overrunning clutch is not connected to the engine;
transmitting by a transmission system motive power to the engine in response to the determining that the overrunning clutch is coupled to the engine; and
driving via an compressor drive shaft a compressor section of the engine according to a design speed.

17. The method for restarting an engine of claim 16, further comprising:
accelerating a compressor section of the engine via the compressor drive shaft according to an acceleration schedule.

18. The method for restarting an engine of claim 17, further comprising:
accelerating a compressor drive shaft to generate a light-off condition in a combustor section of the engine, wherein the compressor drive shaft is associated with the engine.

19. The method for restarting an engine of claim 18, further comprising:
accelerating the compressor drive shaft with a starter motor in response to the generating of the light-off condition.

20. The method for restarting an engine of claim 18, further comprising:
disconnecting the overrunning clutch in response to the accelerating of the compressor drive shaft with the starter motor.

21. The method for restarting an engine of claim 18, further comprising:
driving the compressor drive shaft at a sub-idle speed to maintain an idle ready condition.

22. The method for restarting an engine of claim 18, further comprising:
accelerating the compressor drive shaft with the overrunning clutch in response to the generating of the light-off condition.

23. The method for restarting an engine of claim 22, further comprising:
accelerating the compressor drive shaft to a sub-idle speed in response to the generating of the light-off condition.

24. The method for restarting an engine of claim 17, further comprising:
accelerating the compressor section of the engine with a take-off shaft coupled to the compressor drive shaft.

25. The method for restarting an engine of claim 16, further comprising:
driving a compressor drive shaft to maintain a light-off condition in a combustor section of the engine, wherein the compressor drive shaft is associated with the engine.

26. The method for restarting an engine of claim 16, further comprising:
driving a compressor drive shaft to maintain a sub-idle condition in a combustor section of the engine, wherein the compressor drive shaft is associated with the engine.

* * * * *